Patented July 1, 1924.

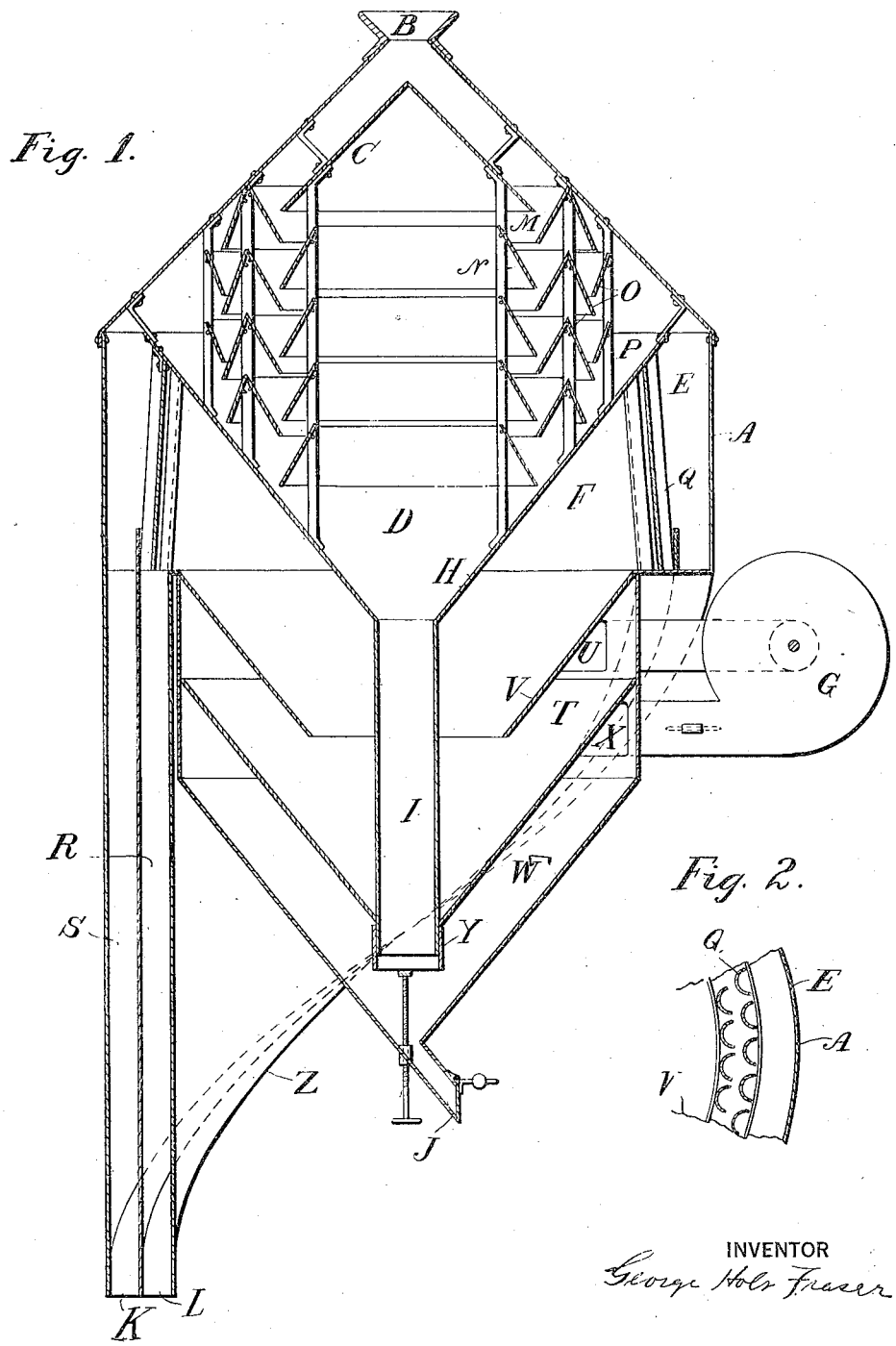

1,499,722

UNITED STATES PATENT OFFICE.

GEORGE HOLT FRASER, OF BROOKLYN, NEW YORK.

AIR SEPARATOR.

Continuation of application Serial No. 69,025, filed December 28, 1915. This application filed August 24, 1921. Serial No. 495,036. Renewed November 24, 1923.

*To all whom it may concern:*

Be it known that I, GEORGE HOLT FRASER, a citizen of the United States, residing in the borough of Brooklyn, county of Kings, city and State of New York, United States of America, have invented certain new and useful Improvements in Air Separators, of which the following is a specification, being a continuation of my original application, Serial Number 69,025 filed December 28, 1915, renewal Serial Number 445,855.

This invention relates to air separators for separating fine dust from coarse material, and aims to provide certain improvements therein.

Heretofore air separators have had external blowers for creating the dust extracting current, but it has been difficult to obtain a uniform current distribution.

This invention aims to insure a uniform current in an external blower air separator, and to insure a uniform fineness of separation and permit a classification of products.

To this end in the preferred form of this invention annular baffle plates are provided between which the material descends in a sinuous path with retarded flow as a tubular blanket outwardly through which the air current flows to float out the dust; the invention also provides an annular series of selecting troughs or rings surrounding the descending material and affording a sinuous path for the outflowing current and a downward passage for coarse particles precipitated in this path; the invention also provides an annular filter for extracting the floating dust from the return current, an equalizing centrifugal suction chamber, an equalizing centrifugal blast chamber, and means for separating the coarse and fine dusts when classification of these is desired.

In the accompanying drawing Fig. 1 is a vertical axial section of an air separator embodying the preferred form of this invention, and Fig. 2 is a fragmentary horizontal section cut through the annular filter thereof.

Referring to the drawings A is the casing, B is the feed hopper, C is the distributor, D is the feed chamber, E is the discharge chamber, F is the return passage, G is the blower, H is the tailings cone, I is the tailings pipe, J is the coarse outlet, K is the dust outlet, and L is the fine outlet of a classifying air separator.

The distributor may be any stationary or revolving distributor, and the casing and blower may be of any usual construction.

One feature of improvement consists in a superposed series of reversely inclined spaced baffle rings M and N below the distributor and between which the material descends in an annular blanket, falling from step to step as the air flows outwardly between the rings and through the material to float out the fine dust.

Another feature of improvement provides a series of reversely inclined troughs or rings O surrounding the descending material and affording sinuous outwardly extending current passages and downwardly extending outlets for any coarse particles precipitated from the outflowing current.

Another feature of improvement consists of an annular settling chamber P surrounding the selecting troughs O or the baffle rings, upwardly and outwardly through which the current flows to reach the outer discharge chamber E, so that any particles precipitating in the chamber P may descend in the cone H with those precipitated from the trough O and the coarse pieces falling through the baffle rings and may descend through the tailings pipe I.

Another feature of improvement consists in an annular filter Q surrounding the return passage F for extracting floating dust from the return current. This comprises two annular concentric rows of grooved troughs or concave members or semi-tubes, staggered so that the inner tubes are opposite the spaces between the outer tubes, so that the fine dust caught in these tubes can descend and will not float into the blower.

Another feature of improvement consists in providing a fine chamber R for receiving the fine dust from the filter tubes and withdrawing it separately from the ordinary dust which settles in the outer dust chamber S.

Another improvement consists of an equalizing suction chamber T having a tangential pipe U leading to the suction side of the blower, and an annular lip V serving as a flange to cause the outflowing current to whirl and equalize around the return chamber F.

Another improvement comprises an equalizing or centrifugal blast chamber W having a tangential inlet X connected to the blast side of the blower, and having an annular lip Y around which the incoming air whirls so that it is equalized before it rises through the tailings pipe I to the feed chamber D. This lip is adjustable and serves as a damper to regulate the current.

Another feature of improvement consists in forming the casing with an open side Z through which the suction and blast chambers are accessible, and in making the fine and dust chambers partially cylindrical and the suction and blast chambers partially cylindrical, and in using the tailings pipe for the return current, and in mounting the baffle rings so that their working edges are uninterrupted and afford a complete annular passage for material.

In operation the material descends in a tubular blanket and the air is sucked uniformly through it. The selectors extract large pieces from the current, and these are returned with the tailings to the pipe I. The coarse dust descends in the discharge chamber E to the dust chamber S. Fine dust is extracted by the filter Q and descends in the fine chamber R when it is desired to classify the fine and coarse dust. The exhaust current whirls in the chamber T and draws uniformly around the passage F, and the blast current whirls in the chamber W and rises uniformly through the pipe I, thus avoiding any inequality in current.

A feature of this invention which is advantageous is that the outer chamber E is a vacuum chamber connected with the suction side of the blower and the inner chamber D is a pressure chamber connected with the blast side of the blower, so that the apparatus is enclosed in a partial vacuum, which is effected by making a closed circuit between the blower and casing, which tends to avoid dust leakage.

It will be seen that the invention provides improvements which can be availed of in various ways, and it will be understood that the invention is not limited to the particular details of construction, arrangement or combination of features, shown as constituting its preferred form, as it can be used according to any form, or any of its features can be employed independently without departing from the spirit of the invention. The baffle rings may be used with any distributor, or the selector rings may be used by themselves. The separate fine chamber may be omitted, and the centrifugal equalizing chambers may one or both be used with any form of separators, and the feature of so connecting the blower and separator that the suction chamber will enclose the blast chamber and cause the apparatus to operate with an outer vacuum effect may be utilized with any connection of the pipes, the exhaust chamber T being capable of location either above or below the feed chamber, and the return passage and filter being correspondingly located when desired.

Claims.

1. In combination, a casing having a conical top, means for causing material to descend therein in an annular downward path and affording a horizontally outwardly extending current passage across said path, annular selecting means surrounding said path for intercepting coarse particles floating through such passage, an annular precipitation chamber surrounding and in communication with said passage and affording a current outlet horizontally outwardly of said passage, means affording an annular wall or partition extending outwardly of and surrounding said path below said current passage for receiving particles precipitated therein inwardly of said outlet and outwardly of said selecting means affording a lower outlet for such particles, and a blower for causing a fluid current to flow outwardly across said path horizontally toward said current outlet and through the latter into said chamber in communication at its suction side with said chamber.

2. In combination, a casing, means for causing material to descend therein in a downward annular path and affording an outward annular current passage crossing such path, annular selecting means surrounding such path for intercepting coarse particles floating through said passage, means affording an annular current outlet horizontally outwardly of and surrounding said selecting means, means affording an annular projection or wall below and extending outwardly of said selecting means for receiving particles precipitated beyond the latter, an annular precipitation chamber below and communicating with said current outlet, an annular exhaust outlet for current from said precipitation chamber, annular filter means for intercepting floating particles in the current flowing from said chamber, and a blower in communication at its suction side with said exhaust passage.

3. In combination, a casing, means for causing material to descend therein in an annular downward path and affording an outwardly extending current passage across said path, annular selecting means surrounding said path for intercepting particles floating in said passage, means affording an annular wall surrounding and projecting outwardly of said selecting means, and affording an outwardly horizontally extending current passage therefrom and an outer annular current outlet, an annular precipitation chamber below and communicating with said outlet and having an annular internal exhaust outlet, annular filtering means below said projecting wall and outwardly of said selecting means for intercepting particles floating in the current toward said exhaust outlet, and a blower in communication at its suction side with said exhaust outlet.

4. In combination, a casing, means for causing material to descend therein in an annular downward path and affording a current passage across said path, means affording a current outlet surrounding and horizontally outwardly of said passage, an annular precipitation chamber below and communicating with said current outlet and having an exhaust outlet at its inner side, a conical wall or partition between said current passage and said chamber affording a top wall for said exhaust outlet and having a lower opening, a downwardly and inwardly inclined wall or partition affording a bottom wall for said exhaust outlet and making a closure with said first mentioned wall around said lower opening, an annular downwardly and inwardly inclined wall or partition intermediate of said walls and affording a partition between the upper portions thereof and a lower annular passage near the lower part thereof, means surrounding said lower opening for varying the space through which current may flow thereto, and a blower connected at its suction side of said exhaust passage under said partition.

5. In combination, a casing, means for distributing material in a path therein affording a current passage across such path, means affording a current outlet at one side of said path and having a lower opening, means affording a settling chamber below and receiving current from said passage, means affording a return passage communicating between said settling chamber and the other side of said path, comprising two similarly inclined walls spaced apart and making a closure around said lower opening, and an intermediate wall or partition spaced apart from and affording a connected passage between said walls, said return passage in communication with said precipitation chamber at one side of said partition, a blower connected at its suction side to said return passage at the other side of said partition and at its blast side in communication with the other side of said path, means affording a tailings conduit below said return passage affording a passage for the current from the blast side of said blower, and means surrounding said lower opening for varying the space through which such current may flow thereto.

6. In combination, a casing having a conical top, means for causing material to descend therein in an annular path and affording an outward current passage, means affording an annular settling chamber communicating with said passage, a cone or wall affording a partition between said passage and said chamber, a lower cone or wall spaced below said first cone, an annular conical wall or partition intermediate of said cones and affording communication between them inwardly of said chamber, means affording an outlet from said chamber to the space above said annular wall, and a blower connected at its suction side with the space below said annular wall and in communication at its discharge side with the space inwardly of said path.

7. In combination, a casing, means for causing material to descend therein in an annular path and affording an outward current passage, means affording an annular settling chamber surrounding said path and communicating with said path, means affording an annular outlet from the inner side of said settling chamber comprising a cylindrical wall inwardly thereof and a downwardly and inwardly tapering conical bottom wall, an annular partition intermediate of and affording communication between said outlet and said bottom wall, a wall spaced below said bottom wall and extending from said cylindrical wall downwardly and inwardly and affording a passage for current, means between said spaced walls for varying the space between them through which current may flow, and a blower connected at its suction side to said cylindrical wall below said partition, and communicating at its blast side with the space within said path.

8. In combination, a casing, means for causing material to descend therein in an annular path and affording an outward current passage, means affording an annular settling chamber surrounding said path and communicating with said path and having an annular outlet at the inner side of said chamber, a blower connected at its suction side with the outlet from said chamber, a conical wall below said outlet, a second similarly inclined conical wall below and spaced apart from said first conical wall and affording a blast chamber between them, means for varying the space between said similarly inclined walls through which such current may flow, means communicating between said chamber and the space within said path, and means communicating between said chamber and blast side of said blower.

9. In combination, a casing, affording an inner feeding chamber and having an open bottom affording a tubular space or passage below said feeding chamber, and having an outer chamber surrounding said open bottom and affording a downward current passage from said inner chamber and a precipitation chamber below said passage, and having an annular inner wall below said precipitation chamber, means for distributing material in a path in said inner chamber affording a current passage across said path, means for causing a fluid current to flow across said path from said inner chamber to said outer passage, means affording a return conduit between said outer passage and said inner chamber, having a cylindrical outer wall entering the space within said inner wall, and means for closing the bottom of said inner chamber accessible through said tubular portion of said casing.

10. In combination, a casing affording an inner feeding chamber and an outer surrounding precipitation chamber affording a current passage in communication therewith, said casing having an open bottom affording a tubular space or passage inwardly of and surrounded by said outer chamber and having a cylindrical inner wall, means affording a return passage communicating between said outer chamber and said inner chamber having an annular outer wall entering within said inner wall and mounted in said tubular space or passage, and means for causing a fluid current to flow across said path into said outer chamber through said return passage and into said inner chamber.

11. In combination, a casing affording an inner feeding chamber and an outer annular precipitation chamber affording a current passage from said inner chamber and having an inner annular wall affording an open bottom tubular space or passage below said inner chamber, means for distributing material in an annular path in said feeding chamber affording a current passage across said path, means affording a tailings cone for said material disposed inwardly of and accessible through said tubular space or passage, means within said inner wall having a separate outer wall and affording a current passage between said outer passage and said inner chamber inwardly of said path, and means for causing a fluid current to flow across said path into said outer chamber and through said return passage.

12. In combination, a casing having a conical top, an annular outer bottom, and a lower central opening, and affording an inner distributing chamber, and affording an outer annular precipitation chamber affording a passage from said inner chamber and having an inner annular outlet below said inner chamber and affording an open bottom tubular passage or space below said outlet, means having a separate outer wall fitting within and closing the central opening of said casing and affording a current return passage mounted in said tubular space or passage and affording communication between said current outlet and said inner chamber, and means for causing a fluid current to flow across said path into said precipitation chamber through said return passage and into said inner chamber.

13. In combination, means defining an endless current passage, means for causing a fluid current to flow through said passage, means for supplying material to be separated to such current, an upper casing enclosing a chamber affording a complementary part of said passage, a separate lower casing without and mounted on said upper casing and enclosing a complementary part of said passage, means affording communication between the parts of said passage in said casings respectively, means affording a way for coarse material through said casings, and means in said passage for intercepting and conducting out of the zone of such current particles floating in such current.

14. In combination, means defining an endless current passage, means for causing a fluid current to flow through such passage, means for supplying material to be separated to such current, a casing enclosing a complementary portion of such passage, a separate casing without said first casing and enclosing a complementary portion of such passage, means affording communication between such portions respectively, means affording a way through said casings for coarse material, and means surrounding said way and disposed in said passage for intercepting and conducting out of the current zone particles floating in such current.

15. In combination, means defining an endless current passage, means for causing a fluid current to flow in said passage, means for supplying material to be separated to such current, a casing enclosing an upper portion of such passage, a separate casing without said first casing and enclosing a lower portion of such passage, and filtering means in such passage for intercepting material floating in such current affording communication between said portions of such passage.

In witness whereof, I have hereunto signed my name in the presence of two subscribing witnesses.

GEORGE HOLT FRASER.

Witnesses:
 EDMUND J. FENN,
 JOSEPH P. TIGHE.